Jan. 15, 1963   J. LÜSCHER   3,074,003
GENERATOR CONTROL ARRANGEMENT
Filed April 13, 1960
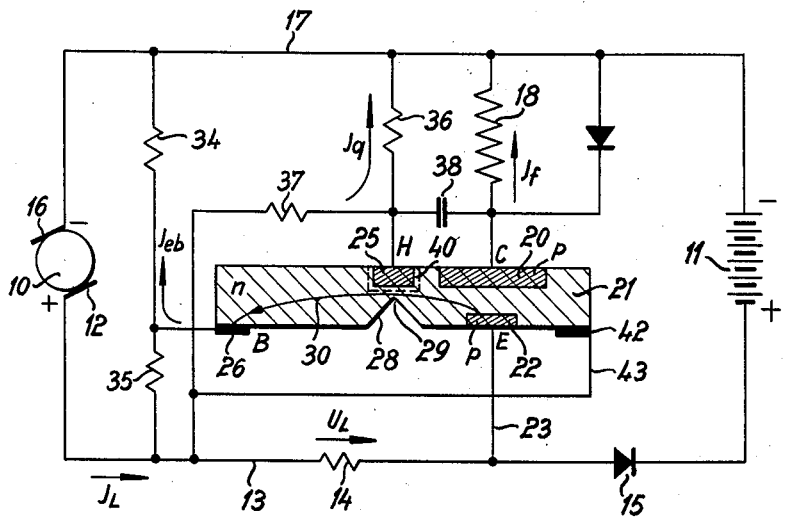
*FIG. 1*
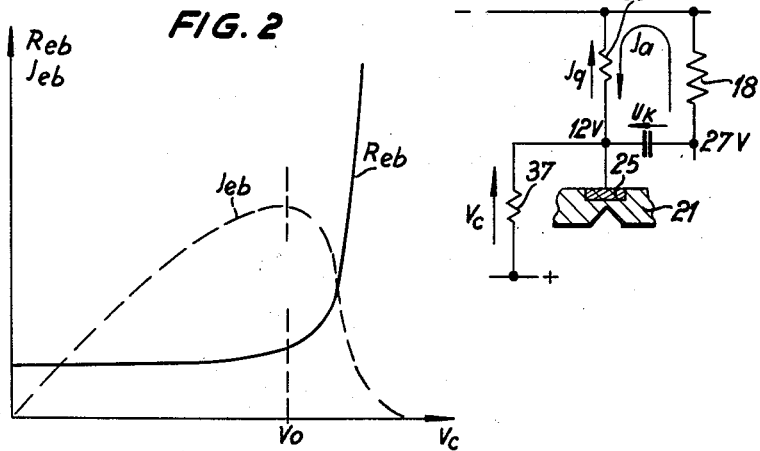
*FIG. 2*
*FIG. 3*
INVENTOR
Jacob Lüscher
by: Michael S. Striker
Attorney

United States Patent Office 3,074,003
Patented Jan. 15, 1963

3,074,003
GENERATOR CONTROL ARRANGEMENT
Jakob Lüscher, Carouge, Geneva, Switzerland, assignor to Robert Bosch G.m.b.H., Stuttgart, Germany
Filed Apr. 13, 1960, Ser. No. 22,023
Claims priority, application Germany Apr. 24, 1959
9 Claims. (Cl. 322—25)

The present invention concerns generator control installations, and more particularly lighting generator installations on vehicles, preferably motor vehicles. Usually generators used in such installations have a shunt exciter winding and control or regulator means connected in the exciter circuit.

Preferably, the regulator means comprise a semi-conductor device connected in series with the exciter winding and capable of changing between conductive and non-conductive condition. In order to make sure that in an installation comprising the above-mentioned components a sufficiently rapid self-excitation is effected when the generator is started after having been at a standstill, it is necessary that the semi-conductor device is already in its conductive condition when the output voltage appearing at the output terminals of the generator is still comparatively low. However, it is desirable that the regulating means are suitable to predetermine a mean value of the exciter current which remains substantially constant under all operating conditions of the generator, in such a manner that, at a sufficiently high minimum rotary speed of the generator, the generator output voltage is practically independent of the magnitude of the load current furnished by the generator and is maintained at a substantially constant predetermined level. In order to accomplish this desirable function it is necessary to provide for control elements which have a resistance characteristic varying considerably depending upon the output voltage of the generator and influence the emitter-collector circuit of the semi-conductor device in such a manner that the exciter current flowing through the emitter-collector circuit is greatly reduced as soon as the generator output voltage is likely to exceed the predetermined level.

It is therefore a main object of this invention to provide for a generator control installation which operates in a manner satisfying the above-mentioned operative conditions.

It is another object of the present invention to provide for an installation of the type set forth which is composed of comparatively few simple and reliable components.

With above objects in view an installation for controlling the output of a generator comprises, according to the invention, in combination a shunt exciter winding connected in parallel with the rotor of the generator; regulating means connected with said exciter winding for maintaining, through exciter regulation, the generator output voltage substantially at a predetermined level, said regulating means including a first control means activated by a predetermined fraction of the generator output voltage and adapted, upon being activated, to apply to said exciter winding an exciter voltage sufficient to rapidly increase the generator output voltage above said predetermined level, and a second control means activated by a predetermined fraction of the generator output voltage and adapted, upon being activated, to decrease said exciter voltage upon said generator output voltage reaching said predetermined level, whereby during operation said generator output voltage is maintained substantially at said predetermined level.

In a preferred embodiment of the invention a single, integral semi-conductor device is used as a regulating means which combines an amplifier portion operating in the manner of a conventional transistor, with a voltage-responsive semi-conductor element acting as a control means for the amplifier portion.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing in which:

FIG. 1 is a schematic circuit diagram illustrating a preferred embodiment of the invention;

FIG. 2 is a diagram illustrating the operational characteristics of the regulating device according to FIG. 1; and FIG. 3 is a portion of the diagram of FIG. 1 serving to illustrate certain details of its operation.

In the installation illustrated by FIG. 1 a direct current generator standardized for delivering 24 volts has a rotor 10 driven by drive means, not shown, e.g., the engine of an automotive vehicle. The shunt exciter winding is shown at 18. The output of the rotor 10 is furnished to a storage battery 11 from the positive brush or terminal 12 via the line 13 which contains a low-resistance resistor 14 of about .02 ohm and a semi-conductor 15, the latter serving as a return-current cutout for preventing a discharge of the battery 11 across the rotor 10 when the rotor is standing still or has insufficient excitation. A line 17 connects the negative brush or terminal 16 of the rotor 10 with the minus terminal of the battery 11. One end of the exciter winding 18 is connected with the negative line 17. The opposite end of the exciter winding 18 is connected across the regulating device and through line 23 with the positive output line 13.

The regulating device comprises a semi-conductor plate 21 made of n-germanium on one main surface whereof a collector zone 20 is formed by alloying the material producing p-conductivity. The collector zone 20 is connected at C with the exciter winding 18. The semi-conductor plate 21 is shown in FIG. 1 at a relatively enlarged scale while it actually has only a thickness of about .3 to .4 mm. In the other main surface of the plate 21, opposite to the collector zone 20, an emitter 22 is formed by alloying the material of the plate 21 with a small amount of semi-conductor material producing p-conductivity, and this emitter zone 22 is connected with the line 23 which leads to a junction point between the above-mentioned resistor 14 and the semi-conductor diode 15. On the same main surface of the semi-conductor body 21 which carries the main collector zone 20 is formed a second alloy zone 25 of similar type, spaced only a small distance from the zone 20. The auxiliary zone 25 serves the purpose of acting as an auxiliary collector in order to control and to regulate the exciter current flowing from the emitter zone 22 to the main collector 20 and from there through the exciter winding 18, depending upon the varying magnitude of the generator output voltage existing between the lines 13 and 17, and to reduce this output voltage substantially as soon as the generator output voltage is likely to exceed its predetermined maximum value which is intended to be maintained at a substantially constant level. The two immediately opposed zones 22 and 20, i.e., emitter and main collector cooperate with a base electrode 26 which is constituted by an ohmic contact arranged near one edge of the semi-conductor plate 21. The base electrode 26 is so arranged that it is far more remote from the emitter zone 22 than the collector zone 20 and the auxiliary collector zone 25. Immediately below, as seen in FIG. 1, the auxiliary collector zone 25 the semi-conductor plate 21 is provided with a notch or groove 28 e.g., by grinding, which projects so deeply into the semi-conductor body 21 that between the bottom 29 of the groove 28, on one hand, and the p-n-boundary between the auxiliary collector zone 25 and the n-conductive material of the semi-conductor plate 21, on the other hand, only a very small transverse cross-sectional area is left for permitting the passage of the current flow 30 (FIG. 1) from the emitter zone 22 to the base 26.

The general circuit of the above described installation is supplemented by two voltage divider arrangements. The first voltage divider is constituted by the series-connected resistors 34 and 35 between the output lines 13 and 17. The junction point between the resistors 34 and 35 is connected with the base electrode 26, while the junction point between the resistors 36 and 37 constituting the second voltage divider is connected with the auxiliary collector zone 25. A condenser 38 is connected between the auxiliary collector 25 and the main collector zone 20 for the purpose of intensifying minute variations occurring in the exciter current flowing from the emitter 22 to the collector 20 in such a manner that the emitter-collector circuit is very rapidly changed from a condition of high conductivity to a condition of low conductivity whenever the exciter current is decreased upon the generator output voltage exceeding the predetermined maximum level, while, to the contrary, the condenser 38 facilitates an abrupt return of the emitter-collector circuit to high conductivity whenever the excitation of the generator during the periodically changing regulation procedure has dropped to such an extent that the generator output voltage is slightly lower than the above-mentioned predetermined maximum level thereof.

In operation the above described generator control device functions as follows:

If the rotor 10 of the generator is started after having been at standstill then, due to magnetic remanence in the iron components of the generator, a certain small output voltage develops between the lines 13 and 17 and increases rapidly because under these circumstances the emitter-collector circuit of the semi-conductor device 21 is in conductive condition so that the exciter current $J_f$ flowing through this circuit increasingly excites the generator and thus effects an increasing rise of the output voltage. In order to maintain the emitter-collector circuits in conductive condition it is necessary that a base current $J_{eb}$ must flow from the emitter 22 along the current path 30 because the emitter-base circuit and emitter-main collector circuit operate in the manner well known from regular transistors. It is evident that the base current $J_{eb}$ must pass through the cross-sectional area limited by the notch 28 below the auxiliary collector zone 25. It must be borne in mind that the emitter-main collector circuit must remain in conductive condition and must carry the full amount of the exciter current $J_f$ until the generator output voltage reaches the above-mentioned predetermined maximum level of 28 volts. In this case practically the full amount of the generator output voltage is applied to the exciter winding 18 because between the emitter 22 and main collector 20 a voltage drop of only about 1 volt exists as long as this emitter-main collector circuit is in fully conductive condition. However, as soon as the generator output voltage reaches the predetermined maximum value the voltage regulation effected by the auxiliary collector 25 sets in as will be described hereinbelow.

It should be noted, however, that the control voltage applied as a predetermined fraction of the generator output voltage from the voltage divider 34, 35 to the base 26 of the transistor 20, 21, 22, 26 is amplified in the well known manner by this transistor arrangement whereby the exciter current $J_f$ flowing through the exciter winding 18 is rapidly increased so as to thereby raise the generator output voltage rapidly at least to the predetermined maximum level thereof.

As long as the second control voltage $V_c$ applied by the voltage divider arrangement 36, 37 as a predetermined fraction of the generator output voltage to the auxiliary collector 25 remains at comparatively low values a very thin space charge zone 40 is formed around the alloyed auxiliary collector zone 25. However, as the generator output voltage increases and consequently the corresponding fraction thereof applied to the auxiliary zone 25 increases, the space charge zone 40 expands toward to the bottom 29 of the notch 28. Hereby the cross-sectional area available for the passage of the current 30 is more and more reduced so that the resulting resistance $R_{eb}$ opposing the current flow 30 increases rapidly as is illustrated by the diagram of FIG. 2. The parameters of the regulating device are so chosen that as soon as the voltage $V_c$ applied to the auxiliary collector 25 exceeds the value $V_0$ the resistance $R_{eb}$ increases so rapidly that even a minute increase of the generator output voltage beyond its predetermined maximum which is related to the reference voltage $V_0$ causes the emitter-base current $J_{eb}$ to decrease rapidly whereby, for obvious reasons, also the exciter current $J_f$ flowing from the emitter 22 to the main collector 20 is substantially reduced.

However, as soon as the potential at the main collector 20, upon reduction of the exciter current $J_f$ drops below the value of 27 volts existing at the beginning of the regulation operation, then simultaneously the voltage $V_c$ existing between the auxiliary collector 25 and the emitter 22 is increased because the condenser 38 which has been previously charged to a potential equal to the potntial difference between the auxiliary collector 25 and the main collector 20, remains in its charge condition for at least a very brief period of time. The condenser charge is dissipated across the ohmic resistance of the exciter winding 18 and the resistor 36 whereby a compensation or transfer current $J_a$ is created which has the flow direction indicated in FIG. 3 and is opposed to the transverse current $J_q$ flowing through the resistor 36. Hereby the voltage $V_c$ acting between the emitter 22 and the auxiliary collector 25 is increased with the result that the emitter-base resistance $R_{eb}$ increases further and the exciter current $J_f$ flowing from the emitter 22 to the main collector 20 and being proportional to the base current $J_{eb}$ drops further as illustrated by the diagram of FIG. 2. In this manner a strong feedback effect is obtained whereby the exciter current is briefly reduced to very low values. However, together with the exciter current also the output voltage of the generator drops off and consequently also the voltage $V_c$ existing between the emitter 22 and the auxiliary collector 25 since this voltage is a fixed fraction of the generator output voltage as determined by the voltage divider resistors 36 and 37. Consequently the space charge zone 40 decreases and permits the passage of an increasing base current $J_{eb}$ across the now increased cross-sectional area toward the base electrode 26. The exciter current $J_f$ now likewise increasing causes across the exciter winding 18 an increasing voltage drop so that the potential existing at the main collector 20 becomes more positive which changes its condition from the previously existing and described blocking condition. Since the condenser 38 now must be recharged to the starting condition indicated by FIG. 3, a compensating current develops which flows in a direction opposite to that indicated in FIG. 3 for the current $J_a$ and increases the voltage drop across the resistor 36 with the result that the effective voltage applied to the auxiliary collector 25 is correspondingly decreased. As long as the just-mentioned compensating current flows the space charge zone 40 around the auxiliary collector 25 remains small and permits the excite current $J_f$ to increase to its full value and thereby causes again an increase of the generator output voltage. As soon as the latter reaches again its predetermined maximum value the whole cycle of regulating operations starts again.

It can be seen from the diagram of FIG. 1 that the installation illustrated thereby not only serves to regulate the output voltage of the generator but also a current regulation or limitation is effected. This takes place when the load current $J_L$ flowing from the generator via line 13 to the batery 11 or other, not shown, current consummers connected with the battery is likely to exceed a maximum value compatible with the structural data of the generator. For carrying out the current regulation a second base electrode 42 is soldered directly i.e., without an interposed blocking layer, to one edge of the semiconductor plate 21 not far from the emitter 22. A line connection 43 leads from the base electrode 42 to the positive output line 13 as shown. Thus the voltage drop $U_L$ developing across the resistor 14 on account of the magnitude of the load current $J_L$ is applied with respect to its polarity to the diode circuit existing between the base electrode 42 and the emitter 22 and acting similarly as a Zener diode in such a manner that this diode circuit normally acts as a blocking device but becomes conductive in a direction opposed to its normal passing direction when the voltage drop $U_L$ exceeds the breakdown voltage of this diode circuit. The current then starting to flow from the base electrode 42 toward the emitter 22 counteracts the current $J_{eb}$ flowing toward the base electrode 26 and depending upon the generator output voltage whereby a substantial decrease of the exciter current $J_f$ is obtained. It is evident that the voltage drop $U_L$ caused by the resistor 14 can be easily determined in such a manner that the above condition occurs whenever the load current $J_L$ exceeds a permissible predetermined value.

It will be understood that each of the elements described above or two or more together, may also find a useful application in other types of generator control installations differing from the types described above.

While the invention has been illustrated and described as embodied in an installation for controlling the output of a shunt generator, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a generator control installation, in combination, a generator having a shunt exciter winding connected in its exciter circuit; first voltage divider means connected with the generator output for supplying a first control voltage being a predetermined fraction of the generator output voltage; second voltage divider means connected with the generator output for supplying a second control voltage being a predetermined fraction of the generator output voltage; regulating semi-conductor means connected in said exciter circuit for maintaining, through exciter regulation, said generator output voltage at a predetermined substantially uniform level, said regulating means including an amplifying transistor device having an emitter-collector circuit in series with said exciter winding and a base electrode connected with said first voltage divider means, and thus being responsive to said first control voltage so as to rapidly increase the exciter current upon an increase of said generator output voltage within the range below said predetermined level, and a non-linear semi-conductor device capable of producing a resistive space charge in said transistor device and connected with said second voltage divider means, said semi-conductor device being responsive to said second control voltage so as to decrease the exciter current controlled by said transistor device, through the resistive action of said space charge upon an increase of said generator output voltage beyond said predetermined level.

2. An installation as claimed in claim 1, wherein said semi-conductor device is inserted across the emitter-base circuit of said transistor device.

3. An installation as claimed in claim 2, wherein said transistor device and said semi-conductor device are formed as an integral semi-conductor element.

4. An installation as claimed in claim 3, wherein said semiconductor device comprises an auxiliary electrode arranged on said semi-conductor element in a position suitable for setting up through said space charge a resistance in the path of the emitter-base current of said transistor device.

5. An installation as claimed in claim 4, wherein said auxiliary electrode is an auxiliary collector electrode, and wherein said integral semi-conductor element is a plate member having two opposite main faces, said auxiliary collector electrode and the collector electrode of said transistor device being arranged on one of said main faces, the emitter electrode being located on the other one of said main faces opposite said collector electrode of said transistor device, while the base electrode thereof is located on said other one of said main faces at a point having from said emitter electrode a greater distance than said collector electrode and said auxiliary collector electrode.

6. An installation as claimed in claim 5, wherein said plate member is provided opposite said auxiliary collector electrode with a notch whereby the cross-sectional area available for the flow of the emitter-base current is substantially reduced between said notch and said auxiliary collector electrode which produces said resistive space charge in said cross-sectional area.

7. An installation as claimed in claim 6, wherein a feedback circuit is provided between said collector electrode and said auxiliary collector electrode.

8. An installation as claimed in claim 7, wherein said feedback circuit comprises impedance means permitting the passage of alternating current.

9. An installation as claimed in claim 8, wherein said impedance means is a capacitor.

References Cited in the file of this patent
UNITED STATES PATENTS

| | | |
|---|---|---|
| 2,801,347 | Dodge | July 30, 1957 |
| 2,801,348 | Pankove | July 30, 1957 |
| 2,809,301 | Short | Oct. 8, 1957 |
| 2,892,143 | Sommer | June 23, 1959 |
| 2,896,149 | Lowry et al. | July 21, 1959 |
| 2,958,033 | Mittag et al. | Oct. 25, 1960 |